US008976133B2

(12) United States Patent
Yao et al.

(10) Patent No.: US 8,976,133 B2

(45) Date of Patent: Mar. 10, 2015

(54) DEVICES AND METHODS FOR IMPROVING IMAGE QUALITY IN A DISPLAY HAVING MULTIPLE VCOMS

(75) Inventors: Wei H. Yao, Palo Alto, CA (US); Ahmad Al-Dahle, Santa Clara, CA (US); Hopil Bae, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 13/599,920

(22) Filed: Aug. 30, 2012

(65) Prior Publication Data

US 2013/0328795 A1 Dec. 12, 2013

Related U.S. Application Data

(60) Provisional application No. 61/657,667, filed on Jun. 8, 2012.

(51) Int. Cl.
*G06F 3/041* (2006.01)

(52) U.S. Cl.
USPC ...... 345/173; 345/174; 178/18.01; 178/18.06

(58) Field of Classification Search
None
See application file for complete search history.

(56) References Cited

U.S. PATENT DOCUMENTS

| | | | | |
|---|---|---|---|---|
| 2007/0109239 | A1 | 5/2007 | den Boer et al. | |
| 2008/0062139 | A1* | 3/2008 | Hotelling et al. | 345/173 |
| 2008/0259009 | A1* | 10/2008 | Gao | 345/87 |
| 2011/0234564 | A1* | 9/2011 | Kim et al. | 345/211 |
| 2011/0248949 | A1 | 10/2011 | Chang et al. | |
| 2011/0267293 | A1* | 11/2011 | Noguchi et al. | 345/173 |

OTHER PUBLICATIONS

International Search Report and Written Opinion for PCT Application No. PCT/US2013/044745 dated Sep. 6, 2013; 10 pgs.

* cited by examiner

*Primary Examiner* — Gregory J Tryder
*Assistant Examiner* — Sepideh Ghafari
(74) *Attorney, Agent, or Firm* — Fletcher Yoder PC

(57) ABSTRACT

Methods and devices for improving image quality in a display having multiple common voltage layers (VCOMs) are provided. In one example, a method may include maintaining a deactivation signal on pixels of the display after programming a frame of data onto the pixels of the display, but before a touch sequence. The method may also include supplying a first data signal to each pixel of a first set of pixels coupled to a first VCOM while maintaining the deactivation signal. The method may include supplying a second data signal to each pixel of a second set of pixels coupled to a second VCOM while supplying the first data signal. The first data signal is supplied to each pixel of the first set of pixels and the second data signal is supplied to each pixel of the second set of pixels to inhibit image distortion during the touch sequence.

24 Claims, 5 Drawing Sheets

DEVICES AND METHODS FOR IMPROVING IMAGE QUALITY IN A DISPLAY HAVING MULTIPLE VCOMS

CROSS REFERENCE TO RELATED APPLICATIONS

This application is a Non-Provisional patent application of U.S. Provisional Patent Application No. 61/657,667, entitled "Devices and Methods for Improving Image Quality in a Display Having Multiple VCOMs", filed Jun. 8, 2012, which are herein incorporated by reference.

BACKGROUND

The present disclosure relates generally to electronic displays and, more particularly, to improving the image quality in a display having multiple common voltage layers (VCOMs).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays, such as liquid crystal displays (LCDs), are commonly used in electronic devices such as televisions, computers, and phones. The electronic displays may portray images by modulating the amount of light that passes through a liquid crystal layer within pixels of varying color. For example, by varying a voltage difference between a pixel electrode and a common electrode in a pixel, an electric field may result. The electric field may cause the liquid crystal layer to vary its alignment, which may ultimately result in more or less light being emitted through the pixel where it may be seen. By changing the voltage difference (often referred to as a data signal) supplied to each pixel, images may be produced on the display. To store data representing a particular amount of light that is to be passed through pixels, gates of thin-film transistors (TFTs) in the pixels may be activated while the data signal is supplied to the pixels.

Electronic displays may include a touch screen for receiving inputs from an operator of the electronic device in which the electronic display is incorporated. In certain configurations, the display may include segmented VCOMs such that a portion of the pixels of the display use a first VCOM and a portion of the pixels of the display use a second VCOM. While operating a touch screen of a display that includes segmented VCOMs, the image quality of the display may be adversely affected because of the segmented VCOMs. For example, pixels using the first VCOM may display an image differently than pixels using the second VCOM.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for improving image quality in a display having multiple common voltage layers (VCOMs). By way of example, a method for improving image quality in a display having multiple VCOMs may include maintaining a deactivation signal on pixels of the display after programming a frame of data onto the pixels of the display, but before a touch sequence. The method may also include supplying a first data signal to each pixel of a first set of pixels coupled to a first VCOM while maintaining the deactivation signal. The method may include supplying a second data signal to each pixel of a second set of pixels coupled to a second VCOM while supplying the first data signal. The first data signal is supplied to each pixel of the first set of pixels and the second data signal is supplied to each pixel of the second set of pixels to inhibit image distortion during the touch sequence.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
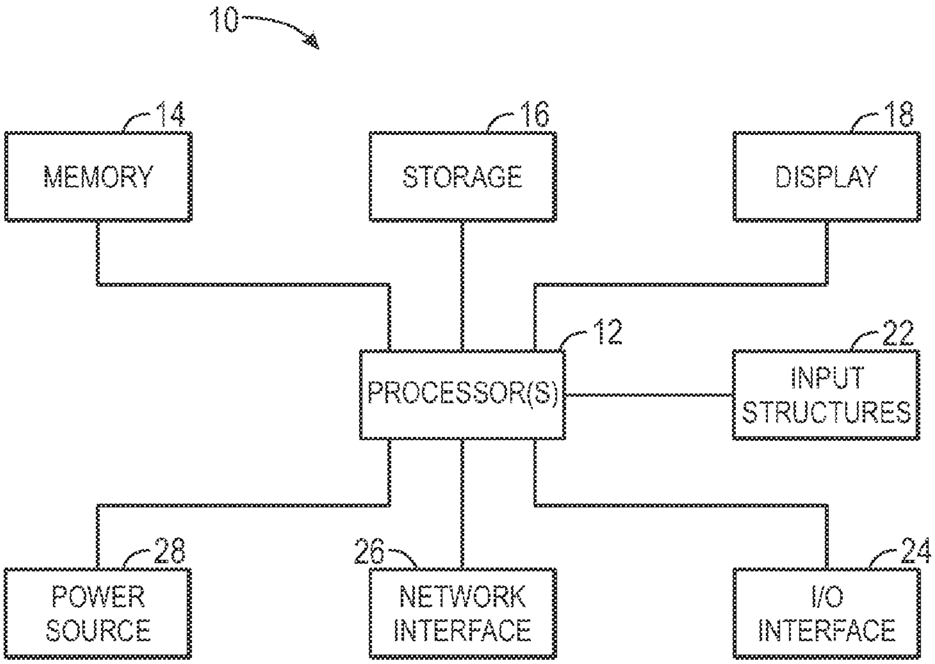
FIG. 1 is a schematic block diagram of an electronic device with a display that may have multiple common voltage layers (VCOMs), in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles “a,” “an,” and “the” are intended to mean that there are one or more of the elements. The terms “comprising,” “including,” and “having” are intended to be inclusive and mean that there may be additional elements other than the listed elements. Additionally, it should be understood that references to “one embodiment” or “an embodiment” of the present disclosure are not intended to be interpreted as excluding the existence of additional embodiments that also incorporate the recited features.

As mentioned above, embodiments of the present disclosure relate to displays and electronic devices incorporating displays that employ a device, method, or combination thereof for improving image quality in a display having multiple common voltage layers (VCOMs). Specifically, rather than supplying a uniform data signal (e.g., the same voltage, an open circuit, ground) to all pixels of a display while the display is being operated in a touch mode (e.g., a time when the pixels are not activated for storing data on the pixels), which could result in undesirable image quality (e.g., color variations between different portions of the display), embodiments of the present disclosure may incorporate hardware, software, or a combination thereof for supplying different data signals (e.g., different voltages) to pixels located on different VCOMs while the display is being operated in the touch mode to improve image quality.

Specifically, to improve image quality of the display during a touch mode, the display may generally operate in a standard manner during a display mode. At the end of the display mode or the beginning of a touch mode, a first data signal may be supplied to a first set of pixels coupled to a first VCOM and a second data signal may be supplied to a second set of pixels coupled to a second VCOM. The first and second data signals are supplied to the source lines of the pixels while the gate lines of the pixels remain deactivated. Accordingly, separate voltages are applied to the source lines of separate VCOMs. These first and second data signals may be applied before the touch mode, through a portion of the touch mode, and/or throughout the touch mode. As a result, it is believed that the leakage current of the TFTs (e.g., of pixels) may be reduced and, accordingly, image quality between portions of the display using different VCOMs may be improved.

Figure 2:
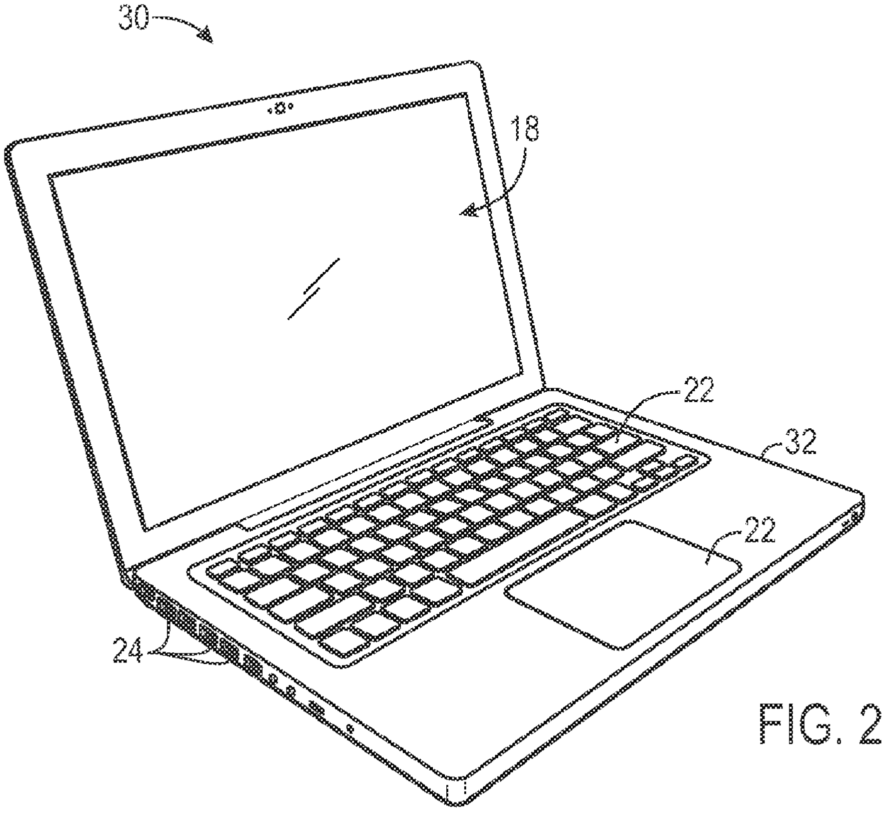
FIG. 2 is a perspective view of a notebook computer representing an embodiment of the electronic device of FIG. 1.
Figure 3:
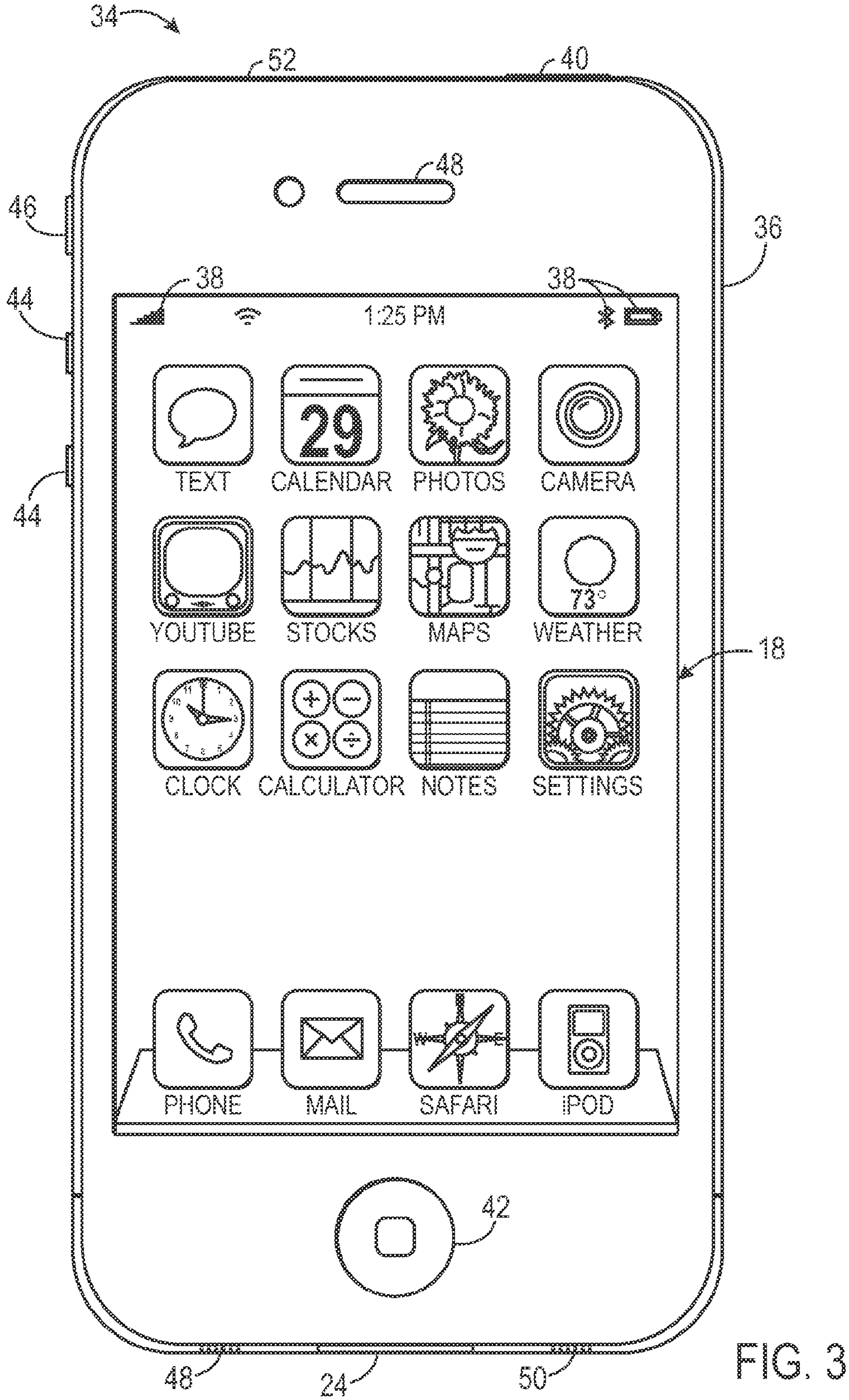
FIG. 3 is a front view of a handheld device representing another embodiment of the electronic device of FIG. 1.

With the foregoing in mind, a general description of suitable electronic devices that may employ electronic displays having capabilities to control supplying different data signals to pixels on different VCOMs is described below. In particular, FIG. 1 is a block diagram depicting various components that may be present in an electronic device suitable for use with such a display. FIGS. 2 and 3 respectively illustrate perspective and front views of a suitable electronic device, which may be, as illustrated, a notebook computer or a handheld electronic device.

Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10. As may be appreciated, when the leakage current of TFTs varies between different VCOMs of the display 18, image quality of the display 18 may be distorted if the source of each TFTs are held the same way. For example, portions of the display 18 using one VCOM may produce different colors than portions of the display 18 using a different VCOM. As such, embodiments of the present disclosure may be employed to increase image quality.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as “data processing circuitry.” This data processing circuitry may be embodied wholly or in part as software, firmware, hardware, or any combination thereof. Furthermore, the data processing circuitry may be a single contained processing module or may be incorporated wholly or partially within any of the other elements within the electronic device 10. As presented herein, the data processing circuitry may control the source lines of the TFTs of the electronic display 18 to alter the voltage applied to the sources of the TFTs and thereby alter the leakage current of TFTs among the different VCOMs of the display 18.

In the electronic device 10 of FIG. 1, the processor(s) 12 and/or other data processing circuitry may be operably coupled with the memory 14 and the nonvolatile memory 16 to execute instructions. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12.

The display 18 may be a touch-screen liquid crystal display (LCD), for example, which may enable users to interact with a user interface of the electronic device 10. In some embodiments, the electronic display 18 may be a MultiTouch™ display that can detect multiple touches at once. As may be described further below, the electronic device 10 may include circuitry to control the source lines of the TFTs of the display 18.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. In one embodiment, the input structures 22 (such as a keyboard and/or touchpad) may be used to interact with the computer 30, such as to start, control, or operate a GUI or applications running on computer 30. For example, a keyboard and/or touchpad may allow a user to navigate a user interface or application interface displayed on the display 18. Further, the display 18 may include TFTs that are controlled to improve image quality of the display 18.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate a user interface to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. As mentioned above, the display 18 may include TFTs that are controlled to vary leakage current among the different VCOMs of the display 18.

Figure 4:
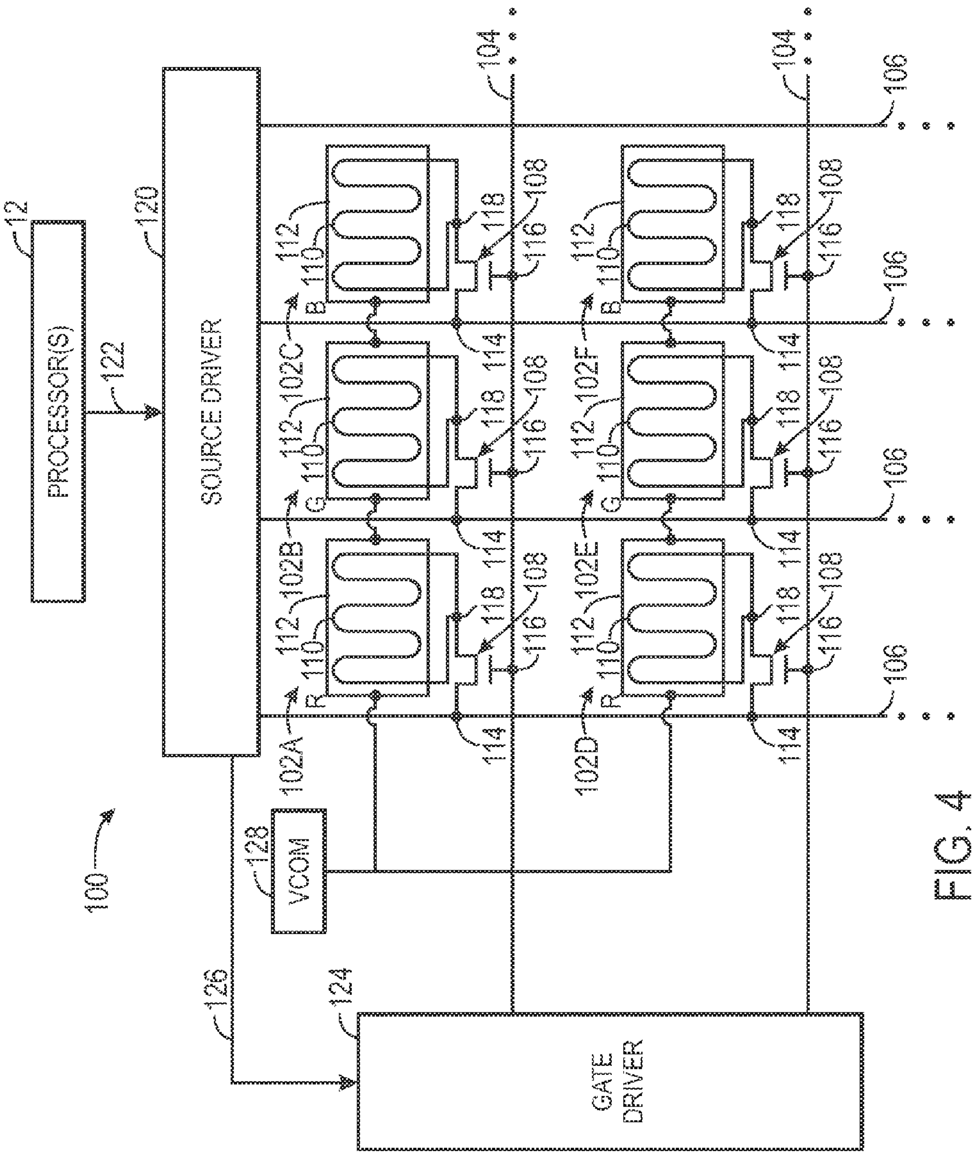
FIG. 4 is a circuit diagram illustrating display circuitry used to improve image quality of a display having multiple VCOMs, in accordance with an embodiment.

Among the various components of an electronic display 18 may be a pixel array 100, as shown in FIG. 4. As illustrated, FIG. 4 generally represents a circuit diagram of certain components of the display 18 in accordance with an embodiment. In particular, the pixel array 100 of the display 18 may include a number of unit pixels 102 disposed in a pixel array or matrix. In such an array, each unit pixel 102 may be defined by the intersection of rows and columns, represented by gate lines 104 (also referred to as scanning lines), and source lines 106 (also referred to as data lines), respectively. Although only six unit pixels 102, referred to individually by the reference numbers 102A-102F, respectively, are shown for purposes of simplicity, it should be understood that in an actual implementation, each source line 106 and gate line 104 may include hundreds or thousands of such unit pixels 102. Each of the unit pixels 102 may represent one of three subpixels that respectively filters only one color (e.g., red, blue, or green) of light. For purposes of the present disclosure, the terms "pixel," "subpixel," and "unit pixel" may be used largely interchangeably.

In the presently illustrated embodiment, each unit pixel 102 includes a thin film transistor (TFT) 108 for switching a data signal supplied to a respective pixel electrode 110. The potential stored on the pixel electrode 110 relative to a potential of a common electrode 112, which may be shared by other pixels 102, may generate an electrical field sufficient to alter the arrangement of a liquid crystal layer of the display 18. In the depicted embodiment of FIG. 4, a source 114 of each TFT 108 may be electrically connected to a source line 106 and a gate 116 of each TFT 108 may be electrically connected to a gate line 104. A drain 118 of each TFT 108 may be electrically connected to a respective pixel electrode 110. Each TFT 108 may serve as a switching element that may be activated and deactivated (e.g., turned on and off) for a period of time based on the respective presence or absence of a scanning or activation signal on the gate lines 104 that are applied to the gates 116 of the TFTs 108.

When activated, a TFT 108 may store the image signals received via the respective source line 106 as a charge upon its corresponding pixel electrode 110. As noted above, the image signals stored by the pixel electrode 110 may be used to generate an electrical field between the respective pixel electrode 110 and a common electrode 112. This electrical field may align the liquid crystal molecules within the liquid crystal layer to modulate light transmission through the pixel 102. Thus, as the electrical field changes, the amount of light passing through the pixel 102 may increase or decrease. In general, light may pass through the unit pixel 102 at an intensity corresponding to the applied voltage from the source line 106.

The display 18 also may include a source driver integrated circuit (IC) 120, which may include a processor, microcontroller, or application specific integrated circuit (ASIC), that controls the display pixel array 100 by receiving image data 122 from the processor(s) 12 and sending corresponding image signals to the unit pixels 102 of the pixel array 100. It should be understood that the source driver 120 may be a chip-on-glass (COG) component on a TFT glass substrate, a component of a display flexible printed circuit (FPC), and/or a component of a printed circuit board (PCB) that is connected to the TFT glass substrate via the display FPC. Further, the source driver 120 may include any suitable article of manufacture having one or more tangible, computer-readable media for storing instructions that may be executed by the source driver 120.

The source driver 120 also may couple to a gate driver integrated circuit (IC) 124 that may activate or deactivate rows of unit pixels 102 via the gate lines 104. As such, the source driver 120 may provide timing signals 126 to the gate driver 124 to facilitate the activation/deactivation of individual rows (i.e., lines) of pixels 102. In other embodiments, timing information may be provided to the gate driver 124 in some other manner. The display 18 may include a Vcom source 128 to provide a VCOM output to the common electrodes 112. In some embodiments, the Vcom source 128 may supply a different VCOM to different common electrodes 112 at different times. In other embodiments, the common electrodes 112 all may be maintained at the same potential (e.g., a ground potential) while the display 18 is on.

Figure 5:
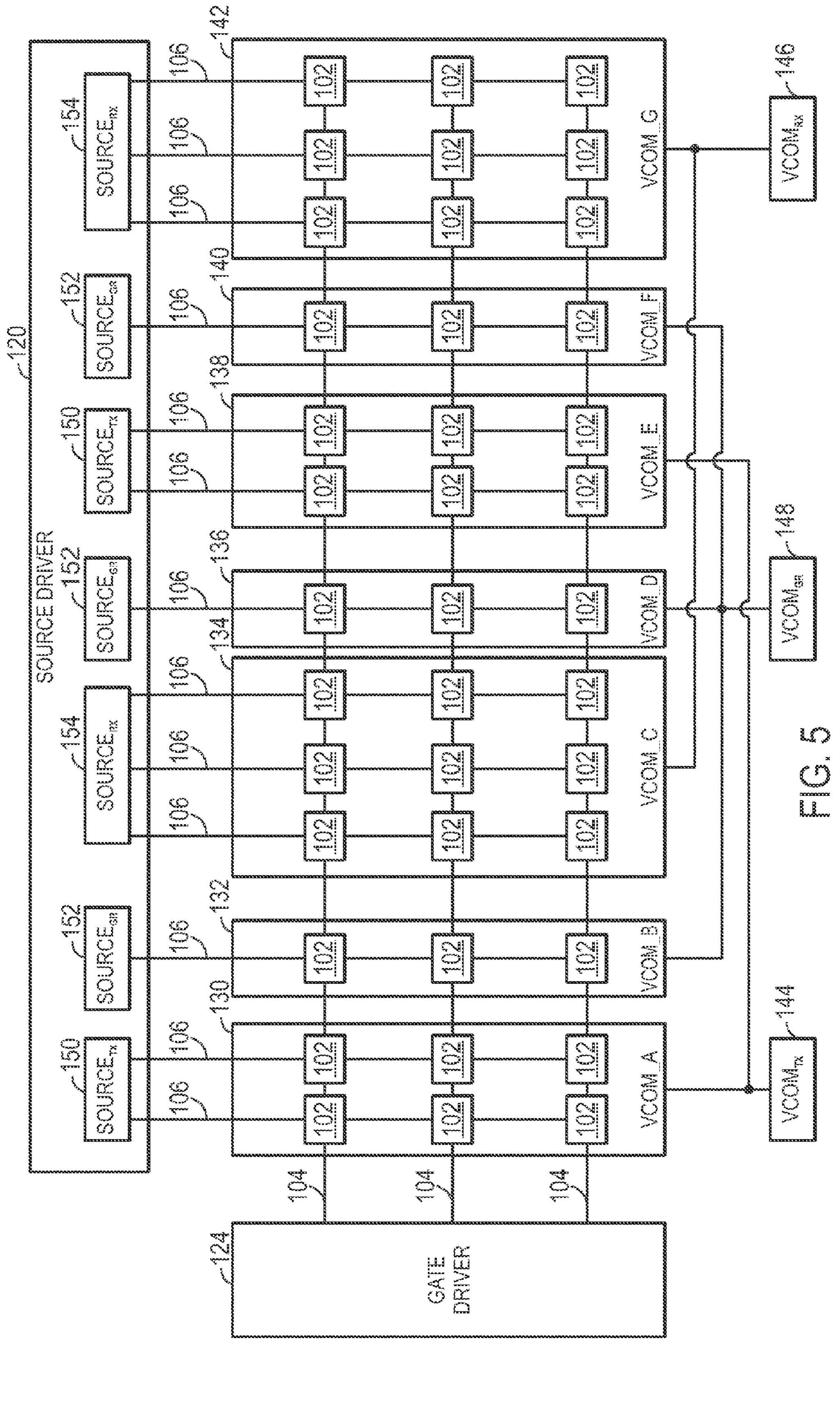
FIG. 5 is a circuit diagram illustrating circuitry of an electronic device for applying different signals to different VCOMs of a display having multiple VCOMs to improve image quality of the display, in accordance with an embodiment.

There are many ways to configure the circuitry of the electronic device 10 so that source lines 106 may be used to vary the leakage current of the TFTs 108 based on which VCOM of the display 18 the pixels 102 are located. FIG. 5 generally represents one embodiment of a circuit diagram of components of the electronic device 10 for applying different signals to different VCOMs of the display 18 having multiple VCOMs to improve image quality of the display 18. In particular, the electronic device 10 includes a VCOM_A 130, a VCOM_B 132, a VCOM_C 134, a VCOM_D 136, a VCOM_E 138, a VCOM_F 140, and a VCOM_G 142. As illustrated, the VCOM_A 130, the VCOM_B 132, the VCOM_C 134, the VCOM_D 136, the VCOM_E 138, the VCOM_F 140, and the VCOM_G 142 each have multiple pixels 102 coupled thereon. As may be appreciated, the VCOMs may have any number of pixels 102 coupled thereon. Furthermore, there may be any number of VCOMs of the display 18. It should be noted that, the common electrodes 112 of the illustrated pixels 102 may be electrically coupled to their respective VCOM.

In certain embodiments, the VCOMs of the display 18 may be arranged into rows and columns. The rows and columns of the VCOMs may be used during a touch mode of the display for sensing touches of the display. For example, a touch driving signal (e.g., a low voltage AC signal) may be supplied to one or more rows of VCOMs. While the signal is supplied, a touch may be sensed using one or more columns of VCOMs. In the present embodiment, the VCOM_A 130 and the VCOM_E 138 may be part of a row of VCOMs. Accordingly, the VCOM_A 130 and the VCOM_E 138 may be electrically coupled together. Furthermore, the VCOM_A 130 and the VCOM_E 138 may be electrically coupled to a $VCOM_{TX}$ 144 configured to provide a touch driving signal to the row of VCOMs. As may be appreciated, the display 18 may include one or more $VCOM_{TX}$ 144 to drive the rows of VCOMs of the display 18.

The VCOM_C 134 and the VCOM_G 142 may be part of the columns of VCOMs of the display 18. For example, the VCOM_C 134 may be part of one column of VCOMs and the VCOM_G 142 may be part of another column of VCOMs. As illustrated, the VCOM_C 134 and the VCOM_G 142 may be electrically coupled together. Furthermore, the VCOM_C 134 and the VCOM_G 142 may be electrically coupled to a $VCOM_{RX}$ 146 configured to sense a touch of the display 18. As may be appreciated, the display 18 may include one or more $VCOM_{RX}$ 146 to sense touches of the display 18. For example, the display 18 may include one $VCOM_{RX}$ 146 for each column of VCOMs.

The display 18 may include VCOMs that function as guard rails configured to inhibit direct capacitive coupling (e.g., without a touch such as from a finger) from occurring between the rows and columns of VCOMs. As illustrated, the VCOM_B 132, the VCOM_D 136, and the VCOM_F 140 may all be guard rails. As illustrated, the VCOM_B 132, the VCOM_D 136, and the VCOM_F 140 may be electrically coupled together. Furthermore, the VCOM_B 132, the VCOM_D 136, and the VCOM_F 140 may be electrically coupled to a $VCOM_{GR}$ 148. As may be appreciated, the display 18 may include one or more $VCOM_{GR}$ 148 that may provide signals to the guard rails.

The gate driver 124 is coupled to the gate lines 104 for activating and/or deactivating the gates 116 of the TFTs 108 of the pixels 102. Furthermore, the source driver 120 is coupled to the source lines 106 for supplying data signals to the sources 114 of the TFTs 108 of the pixels 102. As may be appreciated, the source driver 120 may supply data signals to pixels 102 based on the VCOM that the pixels 102 are coupled to. For example, the source driver 120 may supply data signals of a first voltage to pixels 102 of VCOM rows (e.g., $SOURCE_{TX}$ 150). Furthermore, the source driver 120 may supply data signals of a second voltage to pixels 102 of VCOM guard rails (e.g., $SOURCE_{GR}$ 152). Moreover, the source driver 120 may supply data signals of a third voltage to pixels 102 of VCOM columns (e.g., $SOURCE_{RX}$ 154). Although the $SOURCE_{TX}$ 150, the $SOURCE_{GR}$ 152, and the $SOURCE_{RX}$ 154 are illustrated as being part of the source driver 120, it should be noted that the $SOURCE_{TX}$ 150, the $SOURCE_{GR}$ 152, and the $SOURCE_{RX}$ 154 are illustrated to show that different signals may be supplied to different VCOMs of the display 12 and not that there are necessarily such devices within the source driver 120.

As illustrated, the VCOM_A 130, the VCOM_B 132, the VCOM_C 134, the VCOM_D 136, the VCOM_E 138, the VCOM_F 140, and the VCOM_G 142 may not physically be the same size. Accordingly, the VCOM_A 130, the VCOM_B 132, the VCOM_C 134, the VCOM_D 136, the VCOM_E 138, the VCOM_F 140, and the VCOM_G 142 may have resistive differences. In certain embodiments, the VCOM_A 130 and the VCOM_E 138 may be approximately the same size. Furthermore, the VCOM_C 134 and the VCOM_G 142 may be approximately the same size. Moreover, the VCOM_B 132, the VCOM_D 136, and the VCOM_F 140 may be approximately the same size.

Figure 6:
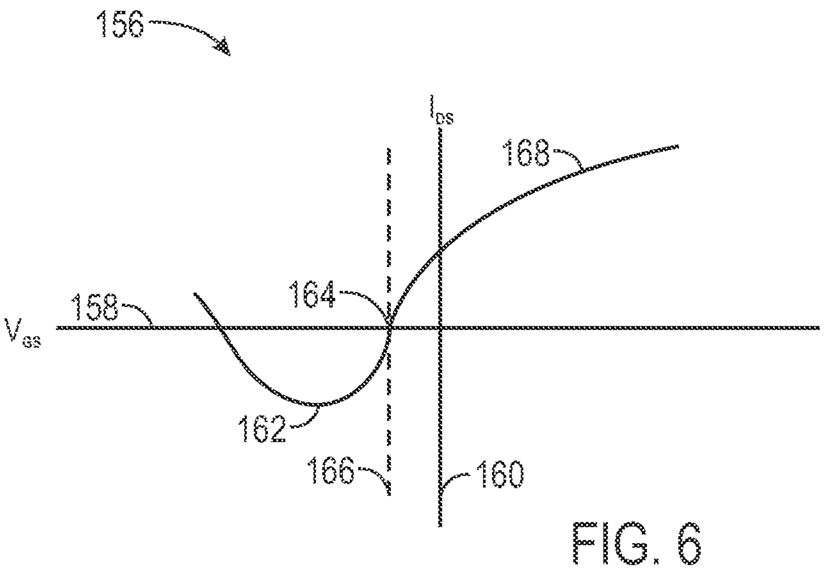
FIG. 6 is a diagram illustrating a relationship between a gate-to-source voltage of a TFT and a drain-to-source current of the TFT, in accordance with an embodiment.

During operation, the display 18 may alternate between a display mode and a touch mode. During the display mode, the display 18 receives image data and provides data signals to pixels 102 to store the image data on the pixels 102. During the touch mode, the display 18 provides a touch driving signal and senses touches that occur. As may be appreciated, when the touch driving signal is applied to the display 18, a gate-to-source voltage of the TFTs 108 of the pixels 102 may be modified, which may result in an increased leakage current (e.g., drain-to-source current) of the TFTs 108. FIG. 6 is a diagram 156 illustrating a relationship between a gate-to-source voltage 158 of a TFT 108 and a drain-to-source current 160 of the TFT 108.

Specifically, the drain-to-source current 160 is negative during a segment 162. At the end of segment 162, the drain-to-source current 160 reaches zero, at point 164. The gate-to-source voltage 158 at point 164 is indicated by a voltage 166 which is a negative voltage. During a segment 168, the drain-to-source current 160 is positive. Accordingly, if the gate-to-source voltage 158 were to fluctuate about the axis 160 based on a touch driving signal (e.g., a low voltage AC signal), the drain-to-source current 160 would fluctuate between a low positive value and a high positive value, resulting in a potential for high leakage, which in turn may decrease the quality of the image of the display 18. However, if the gate-to-source voltage 158 were to fluctuate about an axis formed by the voltage 166, the drain-to-source current 160 would fluctuate between a low negative value and a low positive value, resulting in lower leakage and improving the quality of the image of the display 18. Accordingly, voltages are applied to the source lines 106 to change the gate-to-source voltage 158 and thereby shift the axis related to the drain-to-source current 160 fluctuations.

In certain embodiments, voltages may be applied to the source lines 106 as part of the display mode and remain applied during the touch mode until the display mode resumes. Specifically, data may be stored on the pixels 102 of the display 18 line by line during the display mode until all lines of pixels 102 have data stored on them. For example, if the display 18 were to have 960 lines of pixels 102, during the display mode all 960 lines of pixels 102 may have data stored on them. In certain embodiments, as part of the display mode, the display 18 may act as if it contains a 961st line of pixels 102 (e.g., a virtual line). For the 961st line of pixels 102, voltages are applied to the source lines 106 just as when other lines of pixels 102 store data; however, the gate lines 104 are not activated (e.g., remain deactivated) so that data is not stored on the pixels 102. Furthermore, the voltages applied to the source lines 106 remain after the display mode ends and through the touch mode until the display mode begins again. As such, the voltages applied to the source lines 106 may be considered "parked."

As previously discussed, the voltages applied to the source lines 106 may vary based on the VCOMs that the source lines 106 provide signals to. The voltages may vary in order to tune each set of pixels 102 coupled to a single VCOM so that the TFTs 108 of the VCOM have a minimum amount of leakage current. The difference in voltage between different VCOMs may be due in part to the size of the VCOMs, the number of pixels 102 coupled to the VCOMs, and so forth. In one embodiment, the voltage applied to the source lines represented by $SOURCE_{TX}$ 150 may be approximately a grey 255 voltage, the voltage applied to the source lines represented by $SOURCE_{GR}$ 152 may be approximately a grey 127 voltage, and the voltage applied to the source lines represented by $SOURCE_{RX}$ 154 may be approximately a grey 0 voltage. In another embodiment, the voltage applied to the source lines represented by $SOURCE_{TX}$ 150 may be approximately a grey 255 voltage, the voltage applied to the source lines represented by $SOURCE_{GR}$ 152 may be approximately a grey 204 voltage, and the voltage applied to the source lines represented by $SOURCE_{RX}$ 154 may be approximately a grey 192 voltage. In other embodiments, the voltages applied to the source lines represented by $SOURCE_{TX}$ 150, $SOURCE_{GR}$ 152, and $SOURCE_{RX}$ 154 may be tuned to any suitable voltage. Accordingly, the leakage current of TFTs 108 of the pixels 102 may be reduced and the image quality of the display 18 may be improved.

Figure 7:
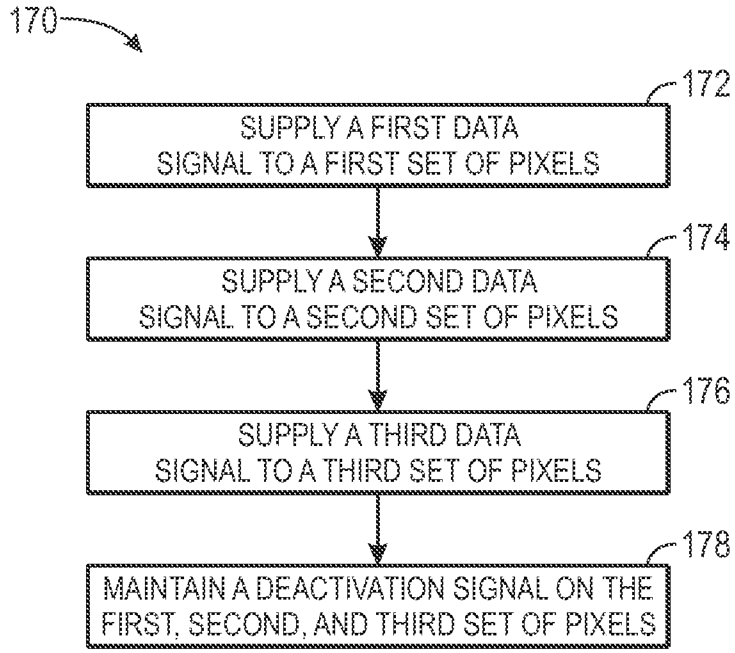
FIG. 7 is a flowchart describing a method for improving image quality in a display having multiple VCOMs, in accordance with an embodiment.

The different voltages applied to the source lines 106 may be provided in any suitable manner. FIG. 7 is a flowchart describing a method 170 that provides different voltages to the source lines 106 to improve image quality of a display 18 having multiple VCOMs. At block 172, a first data signal is supplied to each pixel 102 of a first set of pixels 102 coupled to a first VCOM (e.g., VCOM_A 130). Then, at block 174, a second data signal is supplied to each pixel 102 of a second set of pixels 102 coupled to a second VCOM (e.g., VCOM_C 134) while the first data signal is supplied. A third data signal is supplied to each pixel 102 of a third set of pixels 102 coupled to a third VCOM (e.g., VCOM_B 132) (block 176). At block 178, a deactivation signal is maintained on the first, second, and third sets of pixels 102 while the first, second, and third data signals are supplied to the pixels 102. As may be appreciated, the deactivation signal may be maintained after programming a frame of data (e.g., data for each line of pixels 102 of the display 18), but before a touch mode begins. Accordingly, leakage current of the TFTs 108 of the pixels 102 may be reduced, resulting in improved image quality of the display 18.

It should be noted that the first, second, and third data signals may each be different. For example, the first, second, and third data signals may be separate voltages. Furthermore, the first VCOM may include a first area, the second VCOM may include a second area, and the third VCOM may include a third area. Accordingly, the first area may be greater than the second area, the second area may be greater than the first area, the third area may be greater than the first or second area, and/or the third area may be smaller than the first or second area. In certain embodiments, the first, second, and third data signals may depend at least partially on a difference in size between the first, second, and third areas. In some embodiments, the first VCOM may be configured to provide a touch driving signal, the second VCOM may be configured to sense a touch of the display 18, and the third VCOM may include a guard rail configured to inhibit direct capacitive coupling from occurring between the first VCOM and the second VCOM. In certain embodiments, the first, second, and third data signals are supplied after a display mode stores a frame of data in the pixels 102 and the first, second, and third data signals are not used to store data in the pixels 102 of the display 18.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:

maintaining a deactivation signal on pixels of the display after programming a frame of data onto the pixels of the display, but before a touch mode;

supplying a first data signal to each pixel of a first set of pixels coupled to a first VCOM while maintaining the deactivation signal, wherein the first VCOM comprises a first area that contains the first set of pixels which share a first common electrode; and concurrently supplying a second data signal to each pixel of a second set of pixels coupled to a second VCOM while supplying the first data signal, wherein the second VCOM comprises a second area that contains the second set of pixels which share a second common electrode, wherein the first data signal has a first voltage level and the second data signal has a second voltage level different from the first voltage level;

wherein the first data signal is supplied to each pixel of the first set of pixels and the second data signal is supplied to each pixel of the second set of pixels to inhibit image distortion during the touch mode.

2. The method of claim 1, wherein the first VCOM comprises a first area that is larger than a second area of the second VCOM.

3. The method of claim 2, wherein the first and second data signals at least partially depend on a difference in size between the first area and the second area.

4. The method of claim 1, wherein a first quantity of the first set of pixels is greater than a second quantity of the second set of pixels.

5. The method of claim 1, wherein the first VCOM is configured to provide a touch driving signal.

6. The method of claim 1, wherein the second VCOM is configured to sense a touch of the display.

7. The method of claim 1, comprising supplying a third data signal to each pixel of a third set of pixels coupled to a third VCOM while supplying the first and second data signal, wherein the third VCOM comprises a third area that contains a third set of pixels which share a third common electrode.

8. The method of claim 7, wherein each of the first, second, and third data signals are different.

9. The method of claim 7, wherein the third VCOM comprises a guard rail configured to inhibit direct capacitive charge from occurring between the first VCOM and the second VCOM.

10. An electronic display comprising:

a first set of pixels having a first common voltage (VCOM) electrode;

a second set of pixels having a second VCOM electrode, wherein the second VCOM electrode is different from and unconnected to the first VCOM electrode;

a gate driver configured to maintain a deactivation signal on the first set of pixels and the second set of pixels concurrently; and a source driver configured to concurrently supply a first voltage to the first set of pixels and a second voltage to the second set of pixels concurrently with the deactivation signal being maintained on the first and second sets of pixels, wherein the source driver is configured to supply the first and second voltages during a touch phase of the display to inhibit image distortion by altering a gate to source voltage of the first and second sets of pixels, wherein the first data signal has a first voltage level and the second data signal has a second voltage level different from the first voltage level.

11. The electronic display of claim 10, comprising a third set of pixels having a third VCOM electrode, wherein the third VCOM electrode is different from and unconnected to the first and second VCOM electrodes.

12. The electronic display of claim 11, wherein the gate driver is configured to maintain the deactivation signal on the third set of pixels concurrently with maintaining the deactivation signal on the first and second sets of pixels.

13. The electronic display of claim 11, wherein the source driver is configured to supply a third voltage to the third set of pixels concurrently with the deactivation signal being maintained on the first and second sets of pixels.

14. The electronic display of claim 10, comprising a third set of pixels having a third VCOM electrode and a fourth set of pixels having a fourth VCOM electrode, wherein the third VCOM electrode is different from and unconnected to the second and fourth VCOM electrodes, and the fourth VCOM electrode is different from and unconnected to the first and third VCOM electrodes.

15. The electronic display of claim 14, wherein respective areas containing the first VCOM and the third VCOM are each approximately a first size, and respective areas containing the second VCOM and the fourth VCOM are each approximately a second size.

16. The electronic display of claim 15, wherein the source driver is configured to supply a third voltage to the third set of pixels and a fourth voltage to the fourth set of pixels concurrently with the deactivation signal being maintained on the first and second sets of pixels.

17. The electronic display of claim 14, wherein the first VCOM electrode is coupled to the third VCOM electrode and the second VCOM electrode is coupled to the fourth VCOM electrode.

18. A method comprising:

during a display sequence providing image data to pixels of the display; and during a touch sequence concurrently supplying a first data signal to each pixel of a first set of pixels coupled to a first VCOM electrode and supplying a second data signal to each pixel of a second set of pixels coupled to a second VCOM electrode that is different from and not connected to the first VCOM electrode, wherein the first data signal has a first voltage level and the second data signal has a second voltage level different from the first voltage level.

19. An electronic device comprising:

a housing;

a processor disposed within the housing;

one or more input structures configured to transmit input signals to the processor; and an electronic display coupled to the housing and configured to supply a first data signal to each pixel of a first set of pixels coupled to a first common electrode in a first VCOM, to supply a second data signal to each pixel of a second set of pixels coupled to a second common electrode in a second VCOM while supplying the first data signal, and to maintaining a deactivation signal on each pixel of the first and second sets of pixels while the first data signal is supplied to each pixel of the first set of pixels and while the second data signal is supplied to each pixel of the second set of pixels, wherein the first data signal is supplied to each pixel of the first set of pixels and the second data signal is supplied to each pixel of the second set of pixels to inhibit image distortion during a touch phase of the display, wherein the first common electrode is not coupled to the second common electrode, and wherein the first data signal has a first voltage level and the second data signal has a second voltage level different from the first voltage level.

20. The electronic device of claim 19, wherein during the touch phase the first VCOM is configured to provide a touch driving signal and the second VCOM is configured to sense a touch.

21. A method comprising:

supplying a first data signal to each pixel of a first set of pixels coupled to a first VCOM supply; and supplying a second data signal to each pixel of a second set of pixels coupled to a second VCOM supply while supplying the first data signal and without activating the first and second sets of pixels, wherein the first VCOM supply is different than the second VCOM supply and wherein the first data signal has a first voltage level and the second data signal has a second voltage level different from the first voltage level.

22. The method of claim 21, wherein the first data signal comprises a first voltage supplied to each pixel of the first set of pixels and the second data signal comprises a second voltage supplied to each pixel of the second set of pixels.

23. The method of claim 21, wherein the first data signal and the second data signal are supplied after a display mode stores a frame of data in the pixels of the display and the first and second data signals are not used to store data in the pixels of the display.

24. The method of claim 21, wherein the first data signal and second data signals are provided to display circuitry of each pixel of the first and second sets of pixels, and the first VCOM supply is configured to provide a first common voltage to the display circuitry of the pixels of the first second set of display circuitry, and the second VCOM supply is configured to provide a second common voltage the display circuitry of the pixels of the second set of pixels.

* * * * *